United States Patent [19]
Trotman

[11] 3,911,186
[45] Oct. 7, 1975

[54] PERFORATE COMPOSITE AND CONTINUOUS-STRIP MANUFACTURING METHODS AND APPARATUS

[76] Inventor: Herbert H. Trotman, c/o Comfort Conditioning, Inc. P.O. Box 1046, Virginia Beach, Va. 23451

[22] Filed: Jan. 12, 1973

[21] Appl. No.: 323,326

[52] U.S. Cl. ............... 428/137; 156/64; 156/272; 156/285; 156/324; 156/350; 156/361; 156/378; 156/543; 428/245; 428/255; 428/269; 428/317
[51] Int. Cl.² .......................................... B32B 15/02
[58] Field of Search ......... 161/88, 94, 95, 114, 159, 161/165, DIG. 2; 156/64, 272, 285, 306, 324, 350, 359, 361, 378, 379, 543, 547, 549

[56] References Cited
UNITED STATES PATENTS

| | | | |
|---|---|---|---|
| 3,004,880 | 10/1961 | Lord | 156/359 |
| 3,165,432 | 1/1965 | Plaskett | 156/285 |
| 3,331,728 | 7/1967 | Lane | 156/285 |

*Primary Examiner*—Marion E. McCamish
*Attorney, Agent, or Firm*—Shanley, O'Neil and Baker

[57] ABSTRACT

Continuous processes and apparatus for manufacturing novel perforate composites from non-perforate solidified plastic sheet material and perforate substrate while controllably producing porosity in the composite. The plastic sheet material is conditioned and drawn into interstices of the substrate and ruptured by vacuum-induced gas flow. Mechanical interlocking results from such drawing and ruptured portions of the plastic being wrapped around subsurface portions of the substrate. End product uses are increased by use of adhesive. Porosity and avoidance of damage to film and substrate are controlled by control of process variables including line speed, conditioning temperatures, and vacuum applied.

35 Claims, 7 Drawing Figures

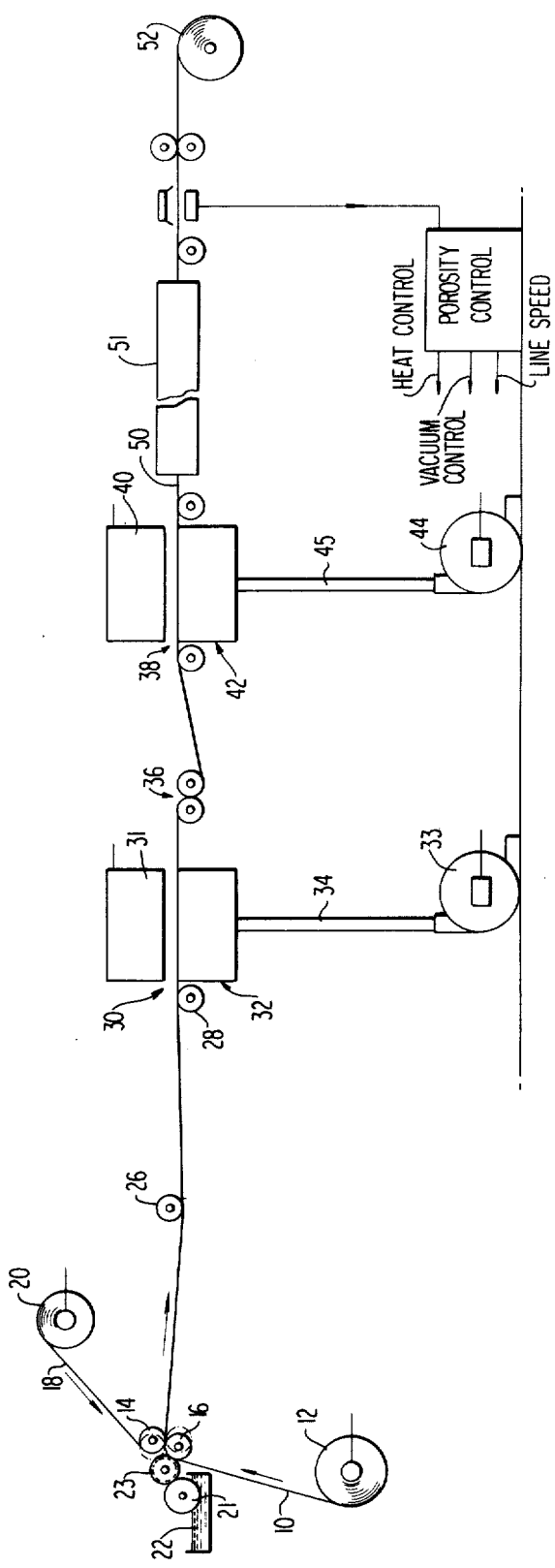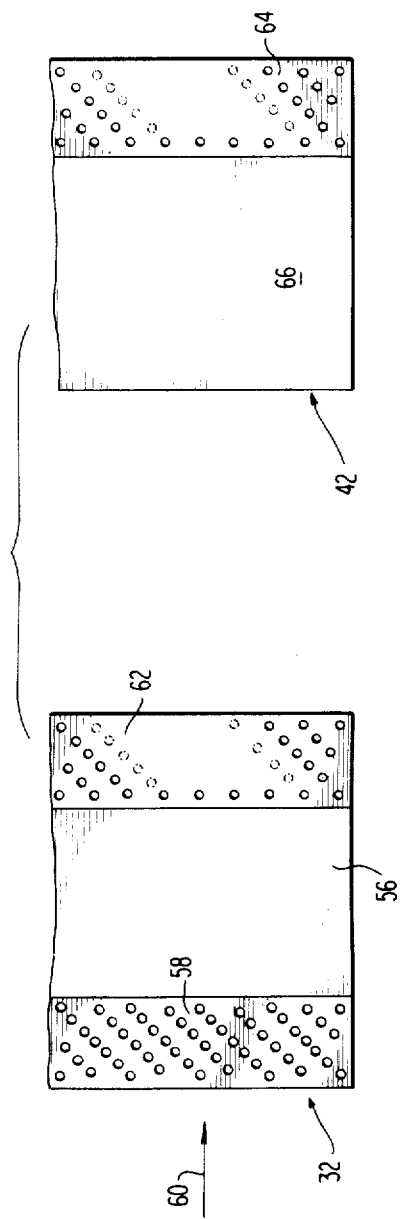

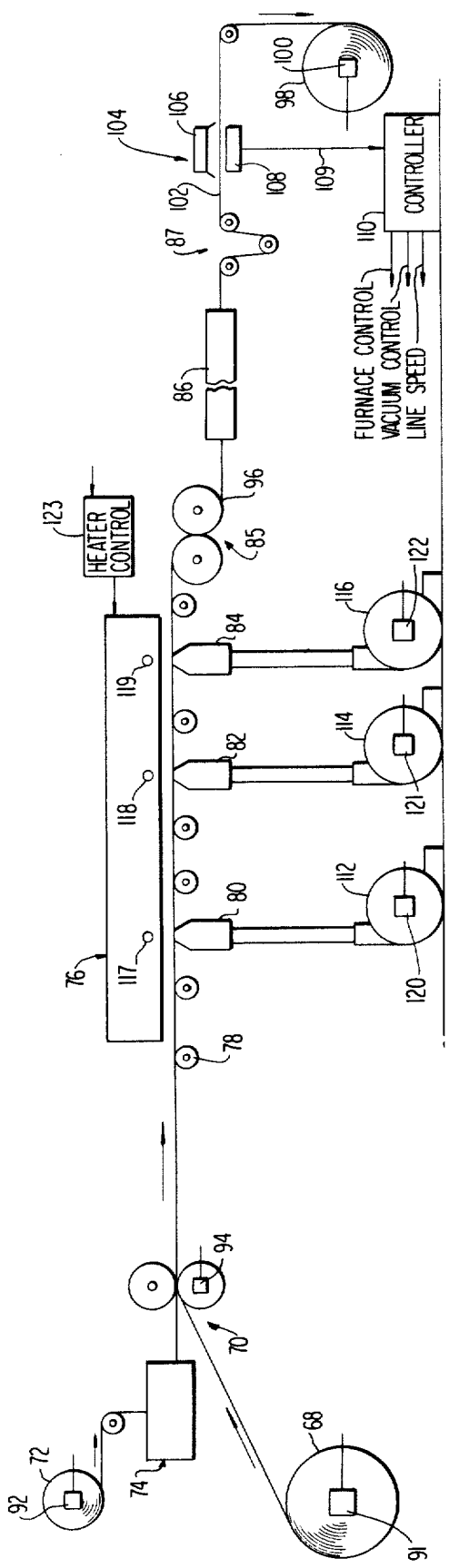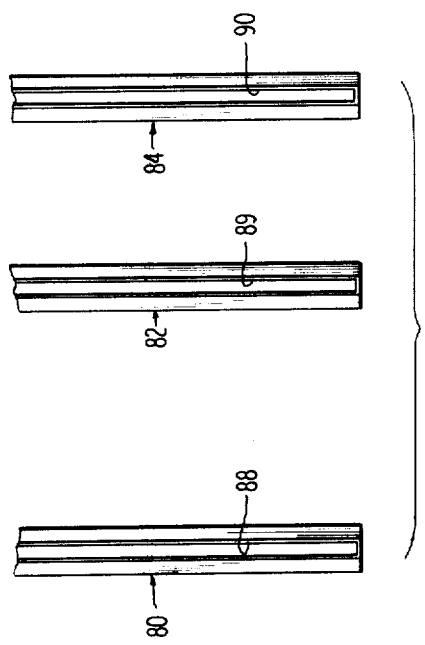

FIG.5
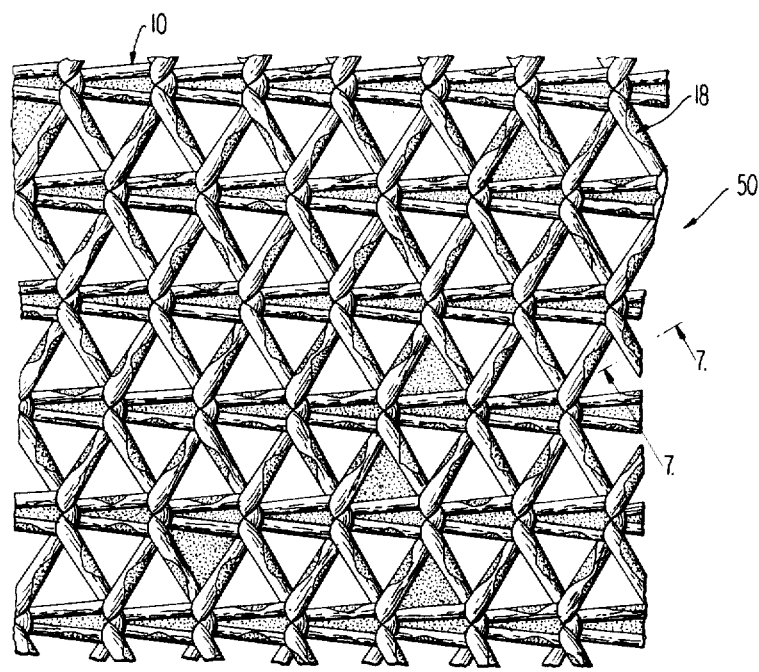
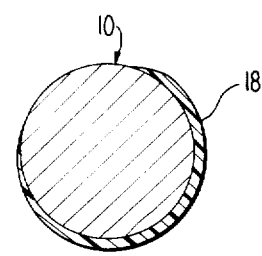
FIG.7
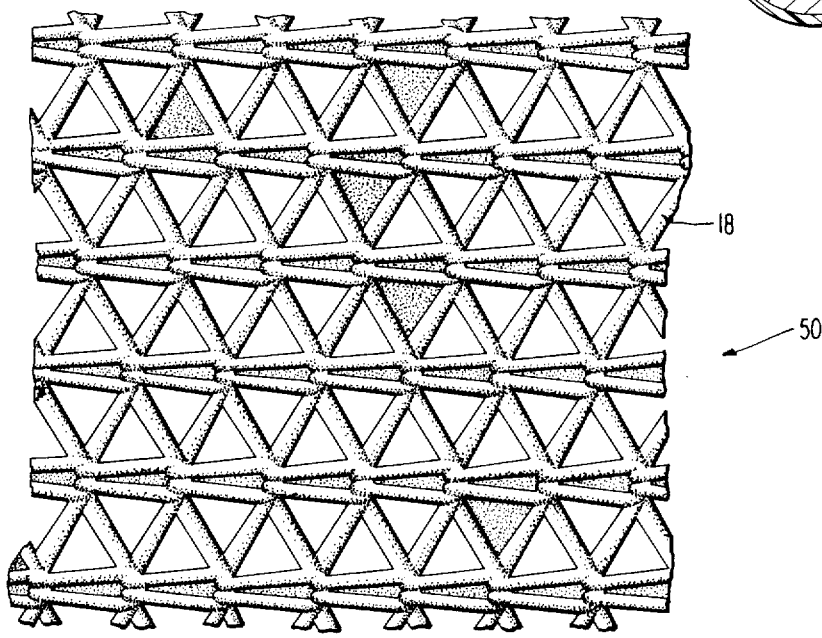
FIG.6

PERFORATE COMPOSITE AND CONTINUOUS-STRIP MANUFACTURING METHODS AND APPARATUS

This invention is concerned with composite, plastic-coated, open mesh material. In its more specific aspects this invention is concerned with continuous-line methods and apparatus for producing an integral composite of a substrate having distributed interstices and a solidified non-perforate plastic film while controllably producing porosity in such composite and mechanically interlocking its components.

"Breathing" comfort during personal use is one of the main advantages of conventional woven fabrics. Tendency to soil, water absorbency, loss of color with usage, low initial strength and further loss of strength with usage, rapid wear, and short life are the known disadvantages of such fabrics. The composite material of the present invention preserves the desirable features of woven fabrics, such as "breathing" comfort and flexibility for personal uses, design attractiveness, and wide selectivity, while eliminating the known disadvantages of such fabrics.

The search for suitably durable and adaptable cover materials, such as those provided by the present invention, has continued for some time. Prior attempts to supply this need include imitation leather-like covering materials and rubber or plastic coated fabrics (see e.g. the U.S. Pat. to Francis No. 2,631,598). All lacked the porosity required for comfort when used on seats and the like. Mechanical puncturing and surface contouring have been tried but the desired "breathing" ability of woven fabrics has not been attained while wearing abilities and durability have suffered.

Other attempts include vulcanizing of material applied in liquid form to selected portions of a substrate as in the patent to Kempel U.S. Pat. No. 1,229,284, or polymerizing of emulsions applied to selected portions of a fabric as in the U.S. Pat. Nos. to Kuhn et al 3,141,810 and Conklin 3,503,821. Lack of uniformity is one inherent difficulty contributing to the change in appearance and change in tactile qualities of the product of such prior art measures. Also, applying rubber or plastic backing to carpeting or other material has been practiced for adding strength to such materials but such backing does not contribute to surface durability, waterproofing, easy maintenance e.g. damp cloth wipe cleaning, and other desirable characteristics of cover materials.

Prior to the present ivnention no development has been advanced to fill the long-felt need for a durable, high-comfort index, cover material which maintained the attractiveness and other characteristics of conventional fabrics or which could approach the economies available with the more conventional textiles.

The present invention makes possible continuous-length processing and the desired economy while in addition providing a new product with desired characteristics of durability, easy maintenance, attractiveness, and "breathing" ability to enable use in seats, and the like, with comfort. A significant contribution of the invention is that it makes possible selection of the best features of two widely differing component fields and combines them into a single composite in which style, pattern, and texture of a textile substrate are protected, and strength and durability are added.

These contributions are brought about by uniformly applying a flexible plastic sheathing to the outer ("right") side of a substrate having distributed interstices. The plastic sheathing is wrapped around individual elements of the substrate, such as fibers of a textile substrate, to fomr an integral composite. Interstices of such substrate are controllably maintained by the inventive process to produce breathing characteristics which approximate those of the substrate or, which can be selectively lower. The plastic film can be applied in clear transparent form to substantially maintain the identity of the substrate, or can be applied as translucent or opaque films for adding color to the substrate.

Other contributions and advantages are brought out in the detailed description of the invention illustrated in the accompanying drawings. In these drawings:

FIG. 1 is a schematic diagram of a continuous processing line embodying the invention, FIG. 2 is a plan view of vacuum plenum surfaces used in the embodiment of FIG. 1, FIG. 3 is a schematic diagram of a continuous processing line embodying the invention, FIG. 4 is a plan view of vacuum plenum surfaces used in the invention, FIG. 5 showing an expanded view of a product of the invention shoring the plastic film wrap-around of the subsurface of a substrate, FIG. 6 is a view of the "outer" surface of the product of FIG. 5, and FIG. 7 is a cross-sectional view of a portion of the product of FIG. 5 taken along the line 7—7.

The invention produces a high strength, durable, open-mesh composite material ideally suitable as a protective and decorative covering in widely varying applications. Uniformity of surface coating, not otherwise available, is obtained by use of a solidified thin plastic sheet material. The result is uniformity of appearance. Change in appearance of the original fabric, if any, is not readily discernible because of the intimate contact of the plastic sheet material with the substrate.

Under the controlled conditions of the invention a uniform thickness, solidified, non-perforate, continuous plastic sheet material is applied to the "outer" surface of a substrate of defined porosity while achieving and maintaining porosity in the composite; further, this is achieved in a continuous-line operation. Starting with a surface bonding of the plastic film and the substrate, a mechanical interlocking between plastic film and substrate is then brought about through the inventive process of wrapping the plastic film around fibers and intersections of fibers of a textile substrate. The mechanical interlocking is such that the components of the composite are not separated by the crumpling, folding or creasing of normal usage, nor by process slitting and other fabricating steps. While such mechanical interlocking is sufficient for ordinary uses of certain composites, adhesives are used to advantage with most component combinations in order to increase versatility of end product uses.

The substrate and solidified plastic film are provided in elongated, continuous-length form. The continuously fed substrate and plastic sheet material are brought into aligned contiguous relationship while traveling into or along a continuous processing line at substantially the same line speed. Adhesive, where utilized, can be applied intermediate these components at the entry end of the continuous-line apparatus.

By conditioning the plastic sheet material, after its contact with the surface of the substrate, wrinkle-free spreading of the solidified plastic sheet material over the substrate is obtained. Preferably this wrinkle-free application of the plastic film to the substrate is obtained through use of a vacuum applied to the remaining surface of the substrate. Proper preconditioning of the plastic film will generally involve heating. The plastic film is heated to the heat-pliable stage after contact with the substrate. As a result, surface adhesion occurs which facilitates handling for continued processing.

Heating of the plastic sheet material is continued after this initial lamination and the temperature of the plastic sheet material is raised beyond the heat pliable range. With continued heating, the plastic sheet material is raised to a temperature in the thermoplastic range and approaching the melt range. The heating is carried out on a continuous-line with the application of vacuum on the subsurface producing a gas flow having an important protective-cooling effect on the substrate.

The vacuum can be applied by passing the laminate over a vacuum plenum surface which defines aperture means confronting the subsurface of the substrate. Presenting the plastic sheet material in the heated thermoplastic condition while applying vacuum, through the surface of the plenum which is apertured and provides a fabric-support surface, pulls a gaseous medium, such as ambient atmosphere, into interstices of the substrate. The plastic film is drawn initially about the upper ("right" side) surfaces of the fibers and intersections of the fibers forming the interstices and into such interstices. The plastic film within such interstices is stretched and ruptured. The ruptured portions of the plastic material are spread from within the interstices to mechanically interclock the plastic material and substrate into an integral composite with the plastic sheet material extending to the subsurface (inner or "wrong" side) of the substrate and wrapping smoothly about fibers and fiber intersections of the substrate on such subsurface. The adhesive, if any, is selected to be conditioned as the plastic, or have characteristics such that it is similarly moved into such interstices and exists between substantially all bonding surfaces between the plastic film and the substrate.

The longitudinal speed of the lamination over the vacuum plenum, the heating of the plastic film, and/or the vacuum applied through the aperture means are controlled, individually or in combination, along with selection of the plastic film material, to achieve the desired porosity. The result in the composite is that portions of the substrate which define such interstices, e.g. threads of fibers, are freshly coated with a firmly-adherent, thin, flexible plastic film.

Referring to FIG. 1, substrate 10 is unwound from coil 12 and fed into the processing line through tension control coil 20 and fed into the processing line through rolls 14 and 16. If an adhesive is to be applied, bath roll 21 transfers a liquid adhesive from bath 22 to a grooved coating application roll 23. By selective positioning of roll 23, adhesive can be applied to either the plastic film or the substrate or, omitted entirely. When applied to the plastic film, bath roll 21 is rotated counterclockwise, when applied to the substrate bath roll 21 is rotated clockwise.

The substrate 10 and film 18 travel along the processing line in contiguous relationship, guided from above by roll 26 and from below by roll 28, into a first heating zone 30. Heater 31 raises the temperature of the plastic film to the heat-pliable stage for the selected film. This preconditioning heating step takes place after the plastic film and substrate have been brought into contact. A vacuum is applied to the subsurface of the substrate through vacuum plenum 32 which is connected to vacuum pump 33 by duct 34.

The vacuum, which draws ambient atmosphere through the substrate interstices across the full width of the material acts to pull the film into intimate, wrinkle-free contact with the substrate. The film and substrate are under slight tension. The gas spreads the thin plastic sheet and a smooth uniform layer of plastic is produced on the substrate.

The plastic film will, because of its preconditioning conform to the upper surface texture of the substrate and will generally present a glossy or "wet" look at this stage. Because of the pliable state of the film, established by heater 31, bonding of the outer surface of the substrate and the film takes place. However, the film and substrate at this preconditioning and alignment stage present a non-porous condition.

The surface bonding of the two materials facilitates handling and the lamination is driven by tension control and drive roll station 36 into a contiguous second heating zone 38. Location and arrangement of the second heating zone is selected so as to avoid significant loss of heat from the plastic material so that the heating of the second zone is a continuation of that initiated earlier.

Heater 40 continues the heating of the plastic film to raise the temperature of the plastic film into the thermoplastic range and/or approaching the melt range. In this condition, the lamination is fed with its subsurface in contact with vacuum plenum 42 the surface of which provides extendedarea support for the fabric. The contact surface of the vacuum plenum defines aperture means to be described later in relation to FIGS. 2 and 4. The vacuum pump 44, through duct 45, creates a gas flow which acts upon the plastic film covering the interstices of the substrate such that the heated plastic is drawn into such interstices to encapsulate the fibers. The liquid adhesive is moved with the film to coat internal portions of the interstices. Rupturing of the plastic film in the interstices occurs and the ruptured plastic material from the interstices is drawn to the subsurface of the substrate. The plastic material is caused to wrap smoothly about subsurface portions of the fibers. Such wrap-around is believed to be due to the divergence of gas passing through the interstices upon rupture of plastic material at such interstices. Another factor is such wrap-around may be the continuous travel of the composite over the aperture means. Further, some springback action of the stretched and ruptured plastic from the interstices is believed to occur and this further enhances the mechanical interlocking between plastic film and substrate elements.

The result is that the plastic coating is continuous and unitary along the upper surface of the fibers. This adds to the strength of the substrate and provides waterproofing characteristics. The plastic material extends into and coats interstices between opposed surfaces and, further, ruptures in all or a selected percentage of the interstices so as to extend and surround portions of the subsurface. The adhesive is brought into contact between all bonding surfaces by such induced movement of the plastic.

The porous composite 50 with newly defined and coated interstices is then fed into and through adhesive curing furnace 51 toward rewind roll 52. Curing times can be extended by use of a looping tower.

Referring to FIG. 2, vacuum plenum 32 defines an extended contact surface 56. At the leading end of the vacuum plenum surface 56, a cross band 58 defines apertures which extend across the full width of the plenum and across the full width of any material handled by the apparatus. It should be noted that the apertures are predeterminedly positioned so that no portion of the substrate misses exposure to an aperture at some instant as the substrate and film travel longitudinally along the continuous processing line in a direction indicated by arrow 60. At the trailing end (down the line in the direction of movement) of vacuum plenum 32 an additional cross band 62, with similarly oriented apertures, is defined. The leading end band 58 helps bring the plastic film and substrate into desirable wrinklefree configuration with any wrinkles in the plastic film, which is placed under slight tension, being smoothed out as the full width of the material is drawn over this smooth apertured surface. The trailing end band 62 helps contribute to a surface bonding of the plastic film and substrate due to the heat-pliable stage of the film. The lamination continues along the processing line and heating is continued in the second heating zone. In passing over the cross band 64 in surface 66 of vacuum plenum 42, a gaseous medium, such as ambient atmosphere, is drawn under high volume flow conditions into the plenum apertures and through the interstices of the substrate by causing rupture of the plastic in the interstices and, the plastic film is drawn into encapsulating relationship to the fibers defining such interstices.

The vacuum plenum surface is designed to support the undersurface of the substrate adjacent to interstices and circumscribes such interstices sufficiently to cause rupture of the plastic film in the interstices without disturbing the positional relationship of the fibers. The vacuum reserve is sufficient to maintain the stretching and rupturing of the plastic material in the remaining interstices as they pass over apertures after rupture has occurred at the first interstices to be exposed to the vacuum.

The vacuum alignment of film and substrate, preliminary heating of the film, surface bonding of the film and substrate, and the production of porosity in the composite with mechanical interlocking while separable steps, can be carried out in a single heating furnace arrangement as shown in FIG. 3.

Referring to FIG. 3, substrate from coil 68 is directed to tension control station 70. Plastic film is fed from coil 72 through an adhesive application station 74, which may be utilized for applying adhesive. Alternately, the substrate, or both the film and substrate may be fed through station 74 and into the continuous processing line. The film and substrate are directed in contiguous relationship into a longitudinally extended heating zone defined by elongated furnace 76. The substrate is supported by a series of rolls such as 78 during its travel beneath elongated heating furnace 76 and by the contact surfaces of the vacuum plenums 80, 82, and 84. Heating within the elongated furnace is controlled. A preliminary heating of the plastic film can be applied to facilitate wrinklefree vacuum application of the plastic sheet material to the substrate at vacuum plenum 80. At vacuum plenum 82 the processing is continued with initiation of surface bonding and initiation of the coating of the inner portions of the interstices of the substrate through stretching of the selected plastic. Rupturing of the plastic film at some interstices can also be initiated. Completion of such porosity production occurs at vacuum plenum 84. The porous composite then travels through tension control station 85 and adhesive curing furnace 86 to looping tower 87. The composite then travels through an inspection station and is directed to rewind roll 98.

The vacuum treatment applied to the subsurface of the substrate can be applied through vacuum slots as shown in FIG. 4. The surface of vacuum plenum 80 defines slot 88 which extends across the full width of the substrate to be treated. Vacuum plenums 82 and 84 define similar slots 89 and 90, respectively. The width of such slots, in the direction of travel of the product, is selected to provide the necessary support of the fibers about interstices so that rupturing of the plastic within the interstices and subsurface wrap-around of the ruptured plastic occurs. Other forms of vacuum plenum adaptable to use with the invention can be perforated rotary drums with exposed upper surfaces in contact with the subsurface of the substrate, on a continuous belt, tractor-tread type, with exposed apertured surface in contact with the substrate. Such embodiments provide for movement of the vacuum plenum support surface with the strand passing through the line, and may be adopted under special conditions. But the stationary plenum structures of FIGS. 2 and 4 are more economical and function satisfactorily with the tupe of textile substrates currently marketed.

The continuous processing lines described include the necessary control mechanisms for coordinated passage of solidified plastic film and substrate through the line. In FIG. 3, unwind roll 68 includes control mechanism 91 and film unwind roll 72 includes control mechanism 92. Tension control station 70 includes control mechanism 94 and station 86 includes control mechanism 96. The rewind roll 98 includes control mechanism 100. Operation of such conventional rpm control mechanisms and looping tower 87 for the purpose of obtaining coordinated movement of continuous strands through a processing line is well known in the continuous strip art and no further description is required for an understanding of the present invention.

The apparatus of the present invention also includes provision for reduction of scrap looses in starting and stopping a run. Wind-up rolls, 52 of FIG. 1 and 98 of FIG. 3, can be provided with a leader which can be pulled back through the line to the starting roll position. The substrate and plastic film are each attached to this leader and are pulled simultaneously into the line. Selected values of line speed, heating temperatures, and vacuum, are established while the leader is in or moving through the line so that proper processing has been established as the substrate and film enter the line, thus avoiding scrap waste. Continuous feed-in of strand and removal of processed composite are utilized during extended runs using looping towers or other well known continuous strand apparatus.

As pointed out earlier, a primary objective accomplished by the present invention is control and distribution of porosity to produce an integral composite comprising plastic film strip on a textile-like substrate. The invention provides methods and apparatus for carrying out this control of porosity in a continuous manner. For running of single or a limited number of bolts of material, visual inspection and operator control are satisfactory. However methods and apparatus for continuously inspecting for effectiveness of the operation are provided for extended runs, such as round-the-clock production.

Referring to FIG. 3, the composite 102 moving, in the direction shown, toward rewind roll 98 passes through porosity testing station 104. Radiation source 106 directs visible light, or other non-penetrating type radiation, through the composite 102. The radiation passing through the newly formed interstices of the composite is measured quantitatively at detector means 108. Such radiation detection and measurement means measures total radiation and distribution of radiation across the width of the strip. Detector means 108 can take the form of an array of detectors distributed across the full width of the composite for measuring the total radiation while including a wiring arrangement to set off an alarm if a detector element, or a series of detector elements, at one or more locations are not activated at the proper frequency thus indicating a continuing blank spot and lack of porosity along some portion of the composite. Electronic detector apparatus are well known in the art for carrying out these functions. Also, other porosity testing means, such as pneumatic means for quantitative measurement of air passage through interstices produced in the composite material can be utilized to provide the indication desired without departing from the scope of the invention.

The indication of blank spaces is signaled by alarm means as explained above and the cause can be investigated and cured on the line. The total quantitative measurement of light radiation (or air) passing through interstices of the composite generates a signal which travels along line 109 to controller 110. The degree of porosity selected can be preselected and set in controller 110.

In accordance with the teachings of the invention, the degree of porosity and the effectiveness of encapsulation of the substrate by the plastic film are responsive selectively, individually or collectively, to factors including the heating provided in the elongated heating furnace 76, the speed of the composite film and substrate along the processing line during its passage through elongated heater 76, and the amount of vacuum applied through the vacuum pumps. For control purposes, the vacuum pumps include control mechanisms 120, 121, and 122 respectively; the elongated furnace 76 includes heater control 123 to control heating at selected intervals along the length of the furnace, and line speed is controlled by the coordination of roll control mechanisms mentioned earlier.

Depending upon the type of substrate, the type and thickness of the plastic film, and the desired porosity, all of which are discussed in greater detail later, the speed of the line, heating temperatures, and the vacuum applied at the selected stages are controlled. The interrelation of these three factors for a particular line is initially established empirically, however typical ranges of operation for various materials can be determined from data set forth later and operational guidelines for the various materials pre-established.

In addition to visual inspection and manual control, a quantitative determination of induced porosity of the composite can be used to generate a signal which is fed to controller 110. Within preset parameters, the factors of furnace temperature, vacuum control, and line speed are balanced.

For example, maximum permissible temperature for the substrate, to avoid scorching or other damage, is predetermined. The speed of the line and vacuum applied are then selectively controlled, while operating within the maximum permissible temperature, to obtain desired porosity. The output of controller 110 is fed as indicated to the control mechanisms for the vacuum pumps and/or the line speed control. Increases in the amount of porosity are obtained by decreasing the line speed, increasng the heat applied if permissible within the desired maximum, or increasing the vacuum applied. Decreasing the degree of porosity is accomplished by increasing the line speed, decreasing the heat, and/or decreasing the vacuum.

Considering avoidance of damage to a substrate, a lower resultant temperature in the substrate is ordinarily required when dealing with paper fibers than when dealing with, for example, asbestos fibers. To obtain the desired porosity with a paper fiber textile, a lower temperature can be selected dependent on the plastic film, or the speed of the line and the vacuum increased to provide the desired porosity. The heat pliable stage, thermoplastic stage, and melt stage temperature characteristics of the plastic film enter into the selection of operating parameters. For more accurate control, temperature indicators, such as 117, 118, and 119, along furnace 76 in FIG. 3 can be used.

The gas flow induced by the vacuum plays an important role in protective cooling of the substrate because of the movement of ambient atmosphere into the vacuum plenum openings. Also, by proper selection of the type of heating means the temperature of the plastic film can be selectively raised to a higher temperature than the substrate. For example, with radiant energy heating of the plastic film, such as heating with infra-red, micro-wave, sonic energy, etc., the plastic film can be raised to a higher temperature than the substrate. Infra-red heating can be adapted to substantially any plastic film, within the above teachings relating to line speed and gas flow control, but infra-red is especially adaptable to opaque plastic film which acts to guard the substrate from overheating. Selected frequency micro-wave (or sonic) heating of a plastic film, e.g. a clear plastic film, enables protection of substantially any substrate because of the preferential heating of the plastic film available. While some radiant heating of the substrate will occur with any heat source, heating of the substrate can be largely limited to conduction heating. The passage of ambient atmosphere into the plenums helps to prevent damaging heating of the substrate. Such heat control contributions of the invention are especially noteworthy when considering the adaptability of the invention to textiles manufactured from paper fibers and when dealing with thicker plastic sheet material, e.g. 20 mils, combined with large interstice substrate for outdoor furniture cover material, and the like.

The inventive process is highly effective in improving the strength and service and adding color and decorative properties to both natural and synthetic fibers. Typical substrates are any of the woven material with defined interstices made from plant fibers, such as cotton, flax, hemp, and the like, or from protein fibers, such as wool, hair, and silk, or from mineral fibers, such as asbestos, or from synthetic fibers, such as nylon and polyester fibers. The invention increases the versatility and expands the end product uses for all these materials.

A preferred plastic film for coating of a substrate is polyurethane film because of its stretch characteristics and maintenance of its flexible characteristics after wrap-around. The latter helps maintain substantially the original "softness" or tactile qualities of the substrate. Thin films, e.g. one, two, or three mils are preferred for purposes of maintaining these tactile qualities, but thicker films can be selected, and porosity controlled, on heavier substrates. Selection of the plastic film may be dependent upon end usage and physicals of the substrate. Thickness of the fiber can be increased as the mesh size increases because of the increase in gas flow available. Weight or denier of the substrate fibers will also affect the amount of plastic which can be supported. One mil, or less, thickness film would generally be applied to fine mesh, i.e., tightly woven fabrics. Greater thickness films can be used as the mesh size and thread size of the fabric increases. For example, film thickness in excess of 5 mils, and approaching 10 mils, has been used for coating heavier substrate such as burlap with polyvinychloride. In manufacturing the latter product 8 mil opaque PVC was applied to 100% jute fabric of 6 ounces per square yard, having 13 ends per inch "warp" and 12 "picks" per inch "fill". Approximately 15 percent rupture was obtained using a temperature of 350°F, line speed of five fpm, and 4 inches of vacuum in the final stage.

The stretch factor characteristic of a selected plastic sheet material is important in the process since the plastic film is drawn into the interstices to coat inner sidewalls of such interstices and, upon rupture, to wrap smoothly about the subsurface of the fibers. In addition to polyurethane, other suitable plastic films can be selected from polyvinylchloride films, polyethylene films, polypropylene films, blends of polyvinyl chloride and, copolymers made from acrylonitrile, butadiene, and styrene blends of PVC and rubber, and selected polystyrenes.

FIGS. 5–7 show various views of a paper fiber substrate, marketed under the name Textilene Sunsure and manufactured by E. W. Twitchell Company of Dothan, Alabama. This substrate was coated with 0.003 inch opaque (yellow) polyurethane at a line speed of 6 fpm, utilizing a preconditioning temperature of about 250°F and final heating temperature of about 350°F to achieve a porosity of about 95 percent. The paper fiber textile was sized before processing with polyvinyl acetate. No adhesive was used during the processing and adhesion resulted such that the plastic cannot be separated by mechanical means without, in effect, damaging both components.

As shown in FIG. 6, the composite product 50 is uniformly and completely coated across the surface to which plastic 18 was applied originally. The subsurface view of FIG. 5 shows the "wrap-around" by rupture portions of plastic sheet 18. The cross-sectional view of FIG. 7 shows the uniformity of coating achieved on the upper surfaces and, the thinning of the plastic within the interstices as the plastic is stretched to the subsurface prior to rupture.

As discussed earlier, the plastic film is not only bonded to the upper surface of the textile substrate but is pulled down into interstices and can surround some 75 per cent, or more, of the cross sectioned periphery of each fiber contiguous to rupture. Plastic bonded to fiber intersections increases the strength at such intersections and yet permits stretch in substantially all directions. Thus the physical properties which influence end product uses of the composite are enhanced. Also, because of the increased surface contact, stemming from the wrap-around, increased adhesive bonding is obtained since the plastic film makes physical bonding contact with a much larger area than the top surface area of the substrate to which the plastic sheet material is initially applied.

As pointed out earlier the plastic sheet is heated to the point of thermoplasticity for drawing. In the inventive process, the substrate is not merely surface coated. The plastic sheet material is drawn into all or substantially all of the interstices of the substrate. The plastic elongates in the interstices to its maximum extent and rupture occurs. The tension within that portion of stretched plastic material, after rupture, is relieved and the plastic material firmly embraces the substrate around the perimeter of an interstice. Adhesion occurs not only in interstices where rupture occurs, but in other interstices by means of the plastic sheet being drawn into substantially all interstices and achieving contact around the inner perimeter of substantially all interstices.

Physical properties of the plastic sheet material when brought to the point of thermoplasticity, such as elongation and draw ratio properties, influence its selection. When the plastic sheet material is being elongated within an interstice, the thickness of that portion of the plastic decreases as it elongates. However, where contact between plastic sheet and any portion of the substrate has occurred adhesion takes place so that the plastic sheet material is no longer reduced in thickness. This accounts for the uniform thickness of the film coating along the top surface of the textile fibers.

The following table sets forth data on typical runs which along with other teachings presented above will enable practice of the invention. These data were collected on continuous-line apparatus of the type illustrated in FIG. 1 capable of handling material of 54 inch width, with the dimension of the vacuum plenums in the direction of web travel being twelve inches, the spacing between vacuum plenums being 32 inches, using infra-red heat sources of incology sheath type ("Chromalox" Type TRID manufactured by Emerson Electric Co., Pittsburgh, Pennsylvania) spaced approximately 1¾ inches from the plastic film, and vacuum pumps having a cubic foot per minute capacity of 250 cfm at each station. Air flow measurements of the substrate and composite were made using the American Society of Textile Manufacturers (ASTM) pneumatic test D-737.

| Material | Substrate Wt Per Sq Yd oz | Count | Film Type | Film Thickness | Line Speed Ft/Min | Temp °F Prel | Temp °F Final | Vacuum Inches Hg. Prel | Vacuum Inches Hg. Final | Air Flow ASTM D-737 cu ft air/sq ft/minute Original | Air Flow ASTM D-737 cu ft air/sq ft/minute After Process | Approx. % Rupture |
|---|---|---|---|---|---|---|---|---|---|---|---|---|
| Knitted Kraft Paper | 6.5 | Wales-9/" Course-12/" | Urethane Opaque Blue | .002" | 5 | 280 | 360 | 9 | 8 | 250 | 60 | 95 |
| Linen | — | Warp-18 ends/" Fill-15 picks/" | Urethane Opaque Blue | .002" | 4 | 250 | 340 | 9 | 8 | 220 | 72 | 90 |
| Knitted Kraft Paper | 6.5 | Wales-9/" Course-12/" | Urethane Opaque Red | .002" | 8 | 280 | 330 | 9 | 9 | 250 | 60 | 95 |
| 100% Cotton | 11.8 | Warp-17 ends/" Fill-15 picks/" | Urethane Clear | .001" | 7 | 240 | 330 | 8 | 9 | 84 | 18.0 | 80 |
| 100% Cotton | 8.0 | Warp-26 ends/" | Urethane Clear | .001" | 7 | 260 | 360 | 8 | 9 | 99 | 25.4 | 95 |
| Upholstery Fabric Rayon Cotton | 18.0 | Warp-76 ends/" Fill-38 picks/" | Urethane Clear | .001" | 7 | 230 | 320 | 11 | 10 | 120 | 45 | 50 |
| 23 Cotton 66 Rayon 8 Acetate 4 Other | 19.5 | Warp-82 ends/" Fill-18 picks/" | Urethane* Clear | .001" | 7 | 230 | 320 | 10 | 9 | 125 | 52 | 30 |

*with adhesive

|  | Widths |  |
|---|---|---|
|  | 44" 45" | 54" |
| Runs | 1, 3   4, 5 | 5, 7 |

Modifications of the apparatus illustrated are available to those skilled in the art. For example the adhesive can be preapplied to the substrate or plastic and be activated by heating. Or the adhesive can be applied in powder or sheet form and activated to liquid phase by heating or other steps. Curing of the adhesive can include various known processes generally directed to reducing the moisture content of the adhesive below two percent. Various other substrate and plastic films can be utilized in accordance with the methods taught to produce the composite of the invention. Also variations in the apparatus can be made to accommodate substrates and plastic films of dimensions and thicknesses other than those specifically set forth. Therefore the scope of the present invention is to be determined from the appended claims.

What is claimed is:

1. Continuous-line process for manufacturing a perforate composite from non-perforate solidified plastic sheet material and perforate substrate while controllably producing porosity in the composite, comprising the steps of providing an elongated perforate continuous-length woven substrate with defined interstices, directing such substrate longitudinally along a continuous-processing line, providing an elongated continuous-length plastic sheet material in solidified non-perforate film form of substantially uniform thickness, directing such plastic sheet material longitudinally along the continuous process line, continuously feeding the substrate and plastic sheet material longitudinally into aligned contiguous relationship while each is traveling along the continuous processing line at substantially the same longitudinal speed, applying such plastic sheet material to overlay substantially entirely one surface of the elongated substrate forming a non-perforate composite in such area of overlay, heating the plastic sheet material after contact with the substrate while applying a vacuum to the remaining surface of the substrate by directing such composite longitudinally over vacuum means while traveling along the continuous processing line, controlling longitudinal speed of travel of such composite over such vacuum means while controlling such heating to produce thermoplasticity in the plastic sheet material, controlling the vacuum applied through such vacuum means to draw such heated plastic sheet material into interstices of the sustrate and stretch the heated plastic sheet material within such interstices toward such remaining surface so as to coat portions of such interstices between opposed surfaces of the substrate, rupturing the plastic sheet material within such interstices by flow of a gaseous medium under control of such vacuum means to produce porosity in the composite distributed over such area of plastic sheet material overlay, with portions of the ruptured plastic sheet material extending to the remaining surface of the substrate and wrapping around portions of such subsurface to mechanically interlock the plastic sheet material and the substrate.

2. The process of claim 1 in which such plastic sheet material is heated to its heat pliable stage after contact with the substrate.

3. The process of claim 2 in which the plastic sheet material is applied uniformly to the surface of the substrate by applying a vacuum to the remaining surface of the substrate as the plastic sheet material is raised to its heat pliable stage.

4. The process of claim 1 in which the plastic sheet material is selected from the group consisting of polyurethane, polyethylene, polypropylene, polyvinyl chloride, blends of polyvinyl chloride and copolymers made from acrylonitrile, butadiene, and styrene, blends of polyvinyl chloride and rubber, and polystyrene.

5. The process of claim 1 in which the plastic sheet material comprises polyurethane film of a thickness extending to five mils which is heated to a temperature in the range of about 250°F to about 350°F while applying such vacuum.

6. The process of claim 1 in which the plastic sheet material has a thickness in the range of approximately one mil to approximately ten mils.

7. The process of claim 1 in which heating of the plastic sheet material includes the step of applying radiant energy to the plastic sheet material.

8. The process of claim 1 in which heating of the plastic sheet material includes the step of applying infra-red heat to an opaque film of plastic sheet material.

9. The process of claim 1 in which heating of the plastic sheet material includes applying micro-wave energy of selected frequency for preferential heating of the plastic sheet material.

10. The process of claim 1 in which an adhesive material is utilized between the plastic sheet material and the substrate to augment bonding between the plastic sheet material and the substrate.

11. The process of claim 10 including the step of curing such adhesive subsequent to production of porosity in such composite.

12. The process of claim 1 including the steps of
distributing an adhesive uniformly between the plastic sheet material and the substrate before placing the substrate and plastic sheet material in contacting relationship, and
moving such adhesive into interstices of the substrate by the drawing of the heated plastic into such interstices.

13. The process of claim 1 in which the substrate comprises woven paper fibers coated with a sizing such as polyvinyl acetate.

14. The process of claim 1 in which the vacuum is applied uniformly across the full width of the continuous-length substrate and plastic sheet material exposing substantially all interstices of the substrate which are covered by the plastic sheet material to the vacuum.

15. The process of claim 1 in which the gaseous medium comprises ambient atmosphere.

16. The process of claim 1 further including the steps of
measuring the porisity produced in the composite while traveling along the continuous processing line, and
controlling porosity of the composite responsively to such porosity measurement.

17. The process of claim 16 in which controlling porosity is carried out by selectively controlling heating of the plastic sheet material, speed of the line, and vacuum applied.

18. Continuous-line apparatus for manufacturing a perforate composite from non-porous solidified plastic sheet material and porous substrate material comprising
continuous line means defining a travel path for continuous-length materials from entry means through an intermediate processing means to exit means,
means for feeding an elongated continuous-length woven substrate with defined interstices into the continuous line means and directing such substrate longitudinally along the continuous line means,
means for feeding an elongated continuous-length plastic sheet material in solidified non-perforate film form of substantially uniform thickness into the continuous line means and directing such plastic sheet material longitudinally along the continuous line means,
means for continuously feeding the substrate and plastic sheet material longitudinally into aligned continuous relationship while each is traveling along the continuous processing line means at substantially the same longitudinal speed,
means for applying such plastic sheet material to overlay substantially entirely one surface of the elongated substrate forming a non-porous composite in such area of overlay,
vacuum means for applying a vacuum to the remaining surface of such substrate while supporting such composite during its travel along the continuous line means,
heating means for conditioning the plastic sheet material and heating the plastic sheet material to its thermoplastic range while applying vacuum to the remaining surface of the substrate,
means for controlling heating of the plastic sheet material,
means for controlling longitudinal speed of travel of such composite over such vacuum means,
means for controlling the vacuum means to draw such heated plastic sheet material into interstices of the substrate and controlling gas flow induced by the vacuum means to rupture the plastic sheet material within such interstices to produce porosity in the composite distributed over such area of plastic sheet material overlay.

19. The apparatus of claim 18 in which the vacuum means presents an extended surface area confronting and supporting such remaining surface of the substrate while vacuum is applied through aperture means in such extended surface area; such aperture means exposing substantially all interstices of the substrate across its full width to vacuum during passage over the vacuum means.

20. The apparatus of claim 18 in which the heating means comprises radiant energy heating means.

21. The apparatus of claim 18 in which the heating means comprises micro-wave energy means including means for selecting frequency for preferential heating of the plastic sheet material.

22. The apparatus of claim 18 including
means for distributing an adhesive uniformly between the plastic sheet material and the substrate before placing the substrate and plastic sheet material in contacting relationship.

23. The apparatus of claim 22 including means for curing such adhesive located along the continuous line means subsequent to production of porosity in the composite.

24. The apparatus of claim 18 including
means for measuring porosity of the composite after vacuum drawing while the composite is traveling along the continuous line means, and
means for controlling porosity of the composite responsively to the means for measuring porosity.

25. The apparatus of claim 24 in which the means for controlling porosity includes
means for selectively controlling heating of the plastic sheet material, speed of the line, and the vacuum applied responsively to the means for measuring porosity.

26. As a new article of manufacture a continuous-length, web-like composite material of controlled porosity comprising a perforate continuous woven substrate having portions defining opposite surfaces and intersections of such portions defining interstices extending between opposite surfaces of the substrate, and a solidified plastic film coating which is continuous along portions of the substrate defining one surface of such substrate, with the solidified plastic film coating portions of the substrate defining selected interstices between opposed surfaces of the substrate and extending onto the remaining surface of such substrate through such selected interstices and being wrapped around portions of such substrate on the remaining surface mechanically interlocking the substrate and solidified plastic film into an integral composite.

27. The article of claim 26 in which the solidified plastic film is selected from the group consisting of polyurethane, polyethylene, polypropylene, polyvinyl chloride, blends of polyvinyl chloride and copolymers made from acrylonitrile, butadiene, and styrene, blends of polyvinyl chloride and rubber, and polystyrene.

28. The article of claim 26 in which the solidified plastic film comprises polyurethane having a thickness in the range of one mil to about five mils along the continuously coated portions defining one surface.

29. The article of claim 26 in which the solidified plastic film is opaque.

30. The article of claim 26 in which the solidified plastic film is transparent.

31. The article of claim 26 in which such fiber portions are selected from the group consisting of plant fibers, protein fibers, mineral fibers, and synthetic fibers.

32. The article of claim 26 further including a bonding adhesive intermediate the substrate and solidified plastic film.

33. A flexible, perforate, composite which is moisture and abrasion resistant along at least one surface comprising a woven substrate with intersecting fibers defining interstices extending between opposite outer and inner surfaces of the textile substrate, a thin flexible coating of a thermoplastic applied in solidified form to the outer surface of such textile substrate to form a continuous, uniform-thickness, unitary film along the fibers on such surface of the textile substance, such thermoplastic coating being discontinuous at selected interstices distributed over the textile substrate and extending into such interstices to the inner surface of such substrate in wrap-around relation to fibers on such inner surface so as to interlock such substrate and thermoplastic coating into an integral composite.

34. The composite of claim 33 in which the fibers are selected from the group consisting of plant fibers, mineral fibers, protein fibers, and synthetic fibers.

35. The composite fabric of claim 33 in which the thermoplastic coating is selected from solidified films consisting of polyurethane, polyethylene, polypropylene, polyvinyl chloride, blends of polyvinyl chloride and copolymers made from acrylonitrile, butadiene, and styrene, blends of polyvinyl chloride and rubber, and polystyrene, such films being of uniform thickness in the range of about 1 mil to about 10 mils.

* * * * *

UNITED STATES PATENT OFFICE
CERTIFICATE OF CORRECTION

PATENT NO. : 3,911,186
DATED : October 7, 1975
INVENTOR(S) : HERBERT H. TROTMAN

It is certified that error appears in the above-identified patent and that said Letters Patent are hereby corrected as shown below:

Column 2, line 4, "fomr" should read -- form --.
Column 2, line 23, delete "showing" and substitute -- is --.
Column 2, line 24, "shoring" should read -- showing --.
Column 3, line 33, "interclock"should read -- interlock --
Column 3, line 50, "of" should read -- or --.
Column 4, line 34, "extendedarea" should read -- extended area --.
Column 4, line 49, "is" should read -- in --.
Column 6, line 30, "tupe" should read -- type --.
Column 9, line 25, "polyvinychloride" should read --polyvinylchlor In the Table, change "emp" to -- temp --.
" " " The "Run No." column is missing.
" " " Under "widths" Runs should be 6,7 instead of 5,7.
Column 12, line 35, "sustrate" should read -- substrate --.
Column 15, line 1, after "having" insert -- fiber --.
Column 16, line 13, "substance" should read -- substrate --

Signed and Sealed this twentieth Day of April 1976

[SEAL]

Attest:

RUTH C. MASON
Attesting Officer

C. MARSHALL DANN
Commissioner of Patents and Trademarks